US009306785B2

(12) United States Patent
Sohn et al.

(10) Patent No.: US 9,306,785 B2
(45) Date of Patent: Apr. 5, 2016

(54) METHOD AND APAPRATUS FOR TRANSMITTING A FRAME IN A WIRELESS LAN SYSTEM

(71) Applicants: LG ELECTRONICS INC., Seoul (KR); KOREA UNIVERSITY RESEARCH AND BUSINESS FOUNDATION, Seoul (KR)

(72) Inventors: Ill Soo Sohn, Anyang-si (KR); Han Bae Kong, Anyang-si (KR); Hae Wook Park, Anyang-si (KR); Inkyu Lee, Anyang-si (KR); Chang Ick Song, Anyang-si (KR)

(73) Assignees: LG ELECTRONICS INC., Seoul (KR); KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 160 days.

(21) Appl. No.: 14/352,633

(22) PCT Filed: Oct. 16, 2012

(86) PCT No.: PCT/KR2012/008419
§ 371 (c)(1),
(2) Date: Apr. 17, 2014

(87) PCT Pub. No.: WO2013/058512
PCT Pub. Date: Apr. 25, 2013

(65) Prior Publication Data
US 2014/0301383 A1    Oct. 9, 2014

Related U.S. Application Data

(60) Provisional application No. 61/547,756, filed on Oct. 17, 2011.

(51) Int. Cl.
*H04Q 9/00* (2006.01)
*H04L 27/26* (2006.01)
*H04B 7/04* (2006.01)
*H04B 7/06* (2006.01)
*H04W 84/12* (2009.01)

(52) U.S. Cl.
CPC .......... *H04L 27/2626* (2013.01); *H04B 7/0452* (2013.01); *H04B 7/0456* (2013.01); *H04B 7/0617* (2013.01); *H04B 7/0619* (2013.01); *H04W 84/12* (2013.01)

(58) Field of Classification Search
CPC ... H04L 1/0001; H04L 5/0023; H04L 5/0037; H04L 5/0058; H04L 5/006; H04L 25/0224; H04L 25/03343; H04W 88/06
USPC .................................................. 370/329, 338
See application file for complete search history.

(56) References Cited

U.S. PATENT DOCUMENTS

2005/0041611 A1* 2/2005 Sandhu ................. H04L 1/0001
370/319
2009/0022128 A1* 1/2009 Nabar ................... H04B 7/0452
370/338
2010/0118794 A1* 5/2010 Horn .................... H04W 72/042
370/329
2010/0309871 A1* 12/2010 Fischer ................. H04L 5/0023
370/329

FOREIGN PATENT DOCUMENTS

| KR | 10-2010-0096210 | 9/2010 |
| KR | 10-2010-0105308 | 9/2010 |
| KR | 10-2011-0043501 | 4/2011 |
| KR | 10-2011-0053286 | 5/2011 |

* cited by examiner

*Primary Examiner* — Wanda Z Russell
(74) *Attorney, Agent, or Firm* — Lee, Hong, Degerman, Kang & Waimey

(57) ABSTRACT

The present invention relates to a method and apparatus for transmitting a frame in a wireless LAN system. An access point (AP) receives a single orthogonal frequency division multiplexing (OFDM) symbol from each of a plurality of stations (STA) and a single-tone request to send (sRTS) frame through a single subcarrier, selects STAs for performing uplink (UL) multiuser (MU)-multiple input multiple output (MIMO) transmission, and transmits to the plurality of STAs a single-tone clear to send (sCTS) frame allocated to the same subcarrier as a subcarrier to which the sRTS frames received from the selected STAs are allocated.

15 Claims, 17 Drawing Sheets

| Category | Action | Group ID management information element |
|---|---|---|

Octets: 1 | 1 | Variable (b)

| Element ID | Length | Spatial stream location for group ID 1 | ... | Spatial stream location for group ID N |
|---|---|---|---|---|

Bits: | | 3bits | | 3bits

METHOD AND APAPRATUS FOR TRANSMITTING A FRAME IN A WIRELESS LAN SYSTEM

CROSS-REFERENCE TO RELATED APPLICATIONS

This application is the National Stage filing under 35 U.S.C. 371 of International Application No. PCT/KR2012/008419, filed on Oct. 16, 2012, which claims the benefit of U.S. Provisional Application Ser. No. 61/547,756, filed on Oct. 17, 2011, the contents of which are hereby incorporated by reference herein in their entirety.

BACKGROUND OF THE INVENTION

1. Field of the Invention

The present invention relates to a wireless local area network (WLAN) and, more particularly, to a method and apparatus for transmitting a frame in a WLAN system.

2. Related Art

Recently, with the development of an information communication technology, various wireless communication technologies have been developed. Among the wireless communication technologies, a wireless local area network (WLAN) is a technology to wirelessly access to an Internet in a home, a company, or a specific service providing area by using portable terminals such as a personal digital assistant (PDA), a laptop computer, and a portable multimedia player (PMP) based on a wireless frequency technology.

Standards for a WLAN are established by institute of electrical and electronics engineers (IEEE) 802.11. IEEE 802.11a/b provide transmission efficiency of 11 Mbps (IEEE 802.11b) or 54 Mbps (IEEE 802.11a) using a frequency band of 2.4 GHz or 5 GHz. IEEE 802.11g provides transmission efficiency of 54 Mbps by introducing orthogonal frequency division multiplexing (OFDM) technology. IEEE 802.11n provides transmission efficiency of 300 Mbps through four spatial streams by introducing multiple-input and multiple-output (MIMO) technology. IEEE 802.11n provides a channel bandwidth of 40 MHz. In this case, transmission efficiency of a maximum of 600 Mbps may be provided.

As the spread of a WLAN is activated and applications using the WLAN are diversified, recently, there is a need for a new WLAN system for supporting throughput higher than data processing speed supported by IEEE 802.11n. IEEE 802.11ac is the next-generation WLAN system which supports very high throughput (VHT) in a frequency domain of 6 GHz or less. IEEE 802.11ac supports a minimum throughput of 1 Gbps on a plurality of stations (STAs). In link for a single STA, a maximum throughput of at least 500 Mbps can be supported. Furthermore, IEEE 802.11ac can support bandwidths of 80 MHz, contiguous 160 MHz, and non-contiguous 160 MHz and/or higher bandwidths. Furthermore, the maximum 256-quadrature amplitude modulation (QAM) method may be applied. For a higher throughput, multi user (MU)-MIMO technology can be supported. In order to support MU-MIMO technology in IEEE 802.11ac, STAs may have one or more antennas. Today, IEEE 802.11ac supports only downlink (DL) MU-MIMO. The number of STAs to which an access point (AP) can transmit packets at the same time is a maximum of 4. When a maximum number of supportable spatial streams is 8, each STA may use a maximum of four spatial streams.

In a DL MU-MIMO environment, a single AP performs transmission and a plurality of STAs performs reception at the same time. In an uplink (UL) MU-MIMO environment, a plurality of STAs performs transmission at the same time and a single AP performs reception. In order to support UL MU-MIMO, there is a need for a method for selecting STAs that perform transmission at the same time. For example, in UL MU-MIMO, STAs that perform transmission at the same time may be selected in a contention-based manner. STAs having traffic to be transmitted request transmission by transmitting a request to send (RTS) message to an AP during a random access period, and only STAs selected in a contention with other STAs may transmit packets during a data transmission period.

In an UL MU-MIMO environment, there is a need for an efficient method for selecting STAs that will perform transmission at the same time.

SUMMARY OF THE INVENTION

The present invention provides a method and apparatus for processing an uplink signal in a wireless local area network (WLAN) system. The present invention provides a method for selecting, by an access point (AP), stations (STAs) performing uplink (UL) transmission at the same time in UL multi user (MU) multiple-input multiple-output (MIMO). Furthermore, the present invention provides a method for selecting, by an AP, STAs performing uplink transmission at the same time based on a single tone in UL MU-MIMO.

In an aspect, a method of transmitting, by an access point (AP), a frame in a wireless local area network (WLAN) system is provided. The method includes receiving single-tone request to send (sRTS) frames from a plurality of stations (STAs) respectively through one orthogonal frequency division multiplexing (OFDM) symbol and one subcarrier, selecting STAs that will perform uplink (UL) multi user (MU) multiple-input multiple-output (MIMO) transmission, and transmitting single-tone clear to send (sCTS) frames allocated to the same subcarrier to which sRTS frames received from the selected STAs have been allocated to the plurality of STAs.

In another aspect, an access point (AP) for transmitting a frame in a wireless local area network (WLAN) system is provided. The AP includes a radio frequency (RF) unit for transmitting or receiving a radio signal, and a processor connected to the RF unit, and configured to wherein the processor is configured to receive single-tone request to send (sRTS) frames from a plurality of stations (STAs) respectively through one orthogonal frequency division multiplexing (OFDM) symbol and one subcarrier, select STAs that will perform uplink (UL) multi user (MU) multiple-input multiple-output (MIMO) transmission, and transmit single-tone clear to send (sCTS) frames allocated to the same subcarrier to which sRTS frames received from the selected STAs have been allocated to the plurality of STAs.

A plurality of STAs can efficiently perform UL MU-MIMO transmission.

BRIEF DESCRIPTION OF THE DRAWINGS

FIG. 8 shows an example of structure of a group ID management frame.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11 (Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a universal mobile telecommunications system (UMTS). 3rd generation partnership project (3GPP) long term evolution (LTE) is part of evolved UMTS (E-UMTS) using evolved-UMTS terrestrial radio access (E-UTRA), and it adopts OFDMA in downlink (DL) and SC-FDMA in uplink (UL). LTE-A (advanced) is the evolution of 3GPP LTE.

IEEE 802.11 is chiefly described as an example in order to clarify the description, but the technical spirit of the present invention is not limited to IEEE 802.11.

Figure 1:
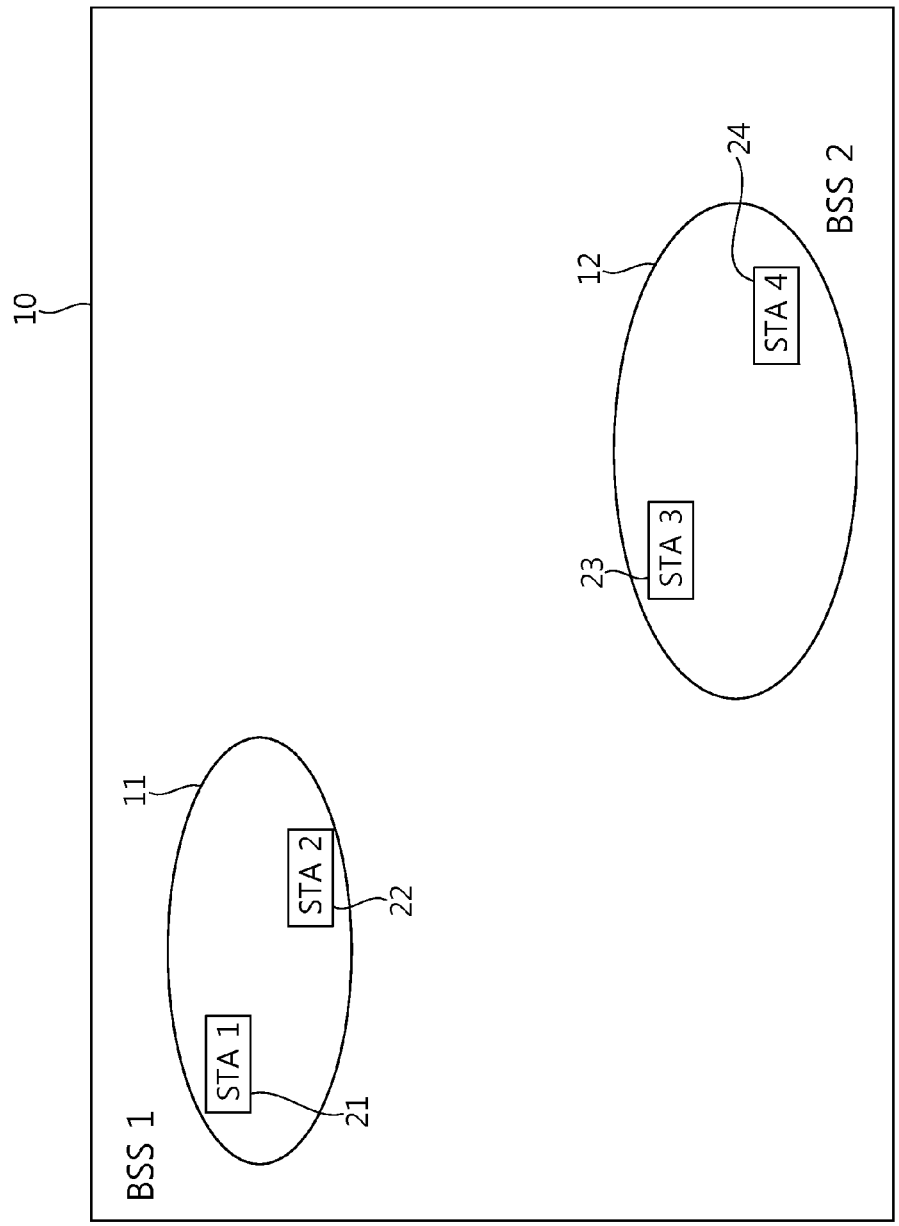
FIG. 1 shows an example of IEEE 802.11 architecture.

FIG. 1 shows an example of IEEE 802.11 architecture.

The IEEE 802.11 architecture may include a plurality of elements that interact with each other in order to provide a WLAN which transparently supports the mobility of an STA to a higher layer. A WLAN system may include one or more basic service sets (BSS). The BSS is a basic building block of IEEE 802.11n. The BSS is a set of STAs that are successfully synchronized with each other and are able to communicate with each other and is not a concept indicative of a specific area.

Referring to FIG. 1, the IEEE 802.11 architecture 10 includes two BSSs of a BSS 1 11 and a BSS 2 12, and each of the BSSs includes two STAs. That is, the BSS 1 11 includes an STA 1 21 and an STA 2 22, and the BSS 2 12 includes an STA 3 23 and an STA 4 24. As shown in FIG. 1, each of the BSSs may be represented by an elliptical area in which STAs forming the BSS may communicate with each other. Such an area may be called a basic service area (BSA). If an STA that forms a BSS gets out of a BSA, the STA is unable to directly communicate with other STAs within the corresponding BSS.

The BSS may be divided into an independent BSS and an infrastructure BSS. The independent BSS is the most basic type of an IEEE 802.11 WLAN system. The independent BSS is a BSS that operates in ad-hoc mode with no plan in advance. The independent BSS does not include a centralized management entity because it does not include an access point (AP). That is, in the independent BSS, non-AP STAs are managed in a distributed manner. In the independent BSS, all STAs may be mobile STAs, and they form a self-contained network because access to a distribution system is not permitted.

The BSSs 11 and 12 of FIG. 1 may be said to be independent BSS (IBSS). The smallest IEEE 802.11 WLAN system may include only two STAs. The BSSs 11 and 12 shown in FIG. 1 may be independent BSSs because they do not include other elements. The STAs may directly communicate with each other.

In contrast, an infrastructure BSS includes one or more non-AP STAs, an AP that provides distribution service, and a distribution system (DS) that connects a plurality of APs. When it is necessary to increase the coverage of a BSS, the BSS may become an element of a network having an extended form which is formed of a plurality of BSSs, instead of increasing the coverage of the BSS. An element that connects the BSSs is called a distribution system. In an infrastructure BSS, an AP manages the non-AP STAs of the BSS.

An STA is a random functional medium that includes media access control (MAC) complying with the IEEE 802.11 standard and the physical layer interface of a wireless medium, and an STA includes both an AP and a non-AP STA in a broader sense. The membership of an STA within a BSS may be dynamically changed. An STA may join a BSS through a synchronization process in order to become a member of the BSS. Furthermore, an STA needs to be associated with an AP in order to access all services provided by an infrastructure IBSS. Such an association may be dynamically performed, and it may include the use of distribution system service (DSS).

A non-AP STA is an STA not an AP, and a non-AP STA may be called a mobile terminal, a wireless device, a wireless transmit/receive unit (WTRU), a user equipment (UE), a mobile station (MS), or a mobile subscriber unit or may be simply called another name, such as a user. Hereinafter, a non-AP STA is called an STA for convenience of description.

In the IEEE 802.11 WLAN system, a wireless medium and a distribution system medium (DSM) are logically separated. Each logical medium may be used for different purposes by different elements. A plurality of logical media may be the same or different.

An AP is an entity that provides access to a distribution system via a wireless medium for STAs associated with the corresponding AP. Data between a BSS and a DS is transmitted through an AP. Furthermore, in an infrastructure BSS including an AP, communication between STAs is performed via an AP in principle. If direct link has been set up, however, STAs may directly communicate with each other. An AP is a kind of STA and thus may have its own address. For communication on a wireless medium or communication on a distribution system medium, an address used by an AP may need not to be the same. An AP may also be called a central controller, a base station (BS), a NodeB, a base transceiver system (BTS), a site controller, etc.

Figure 2:
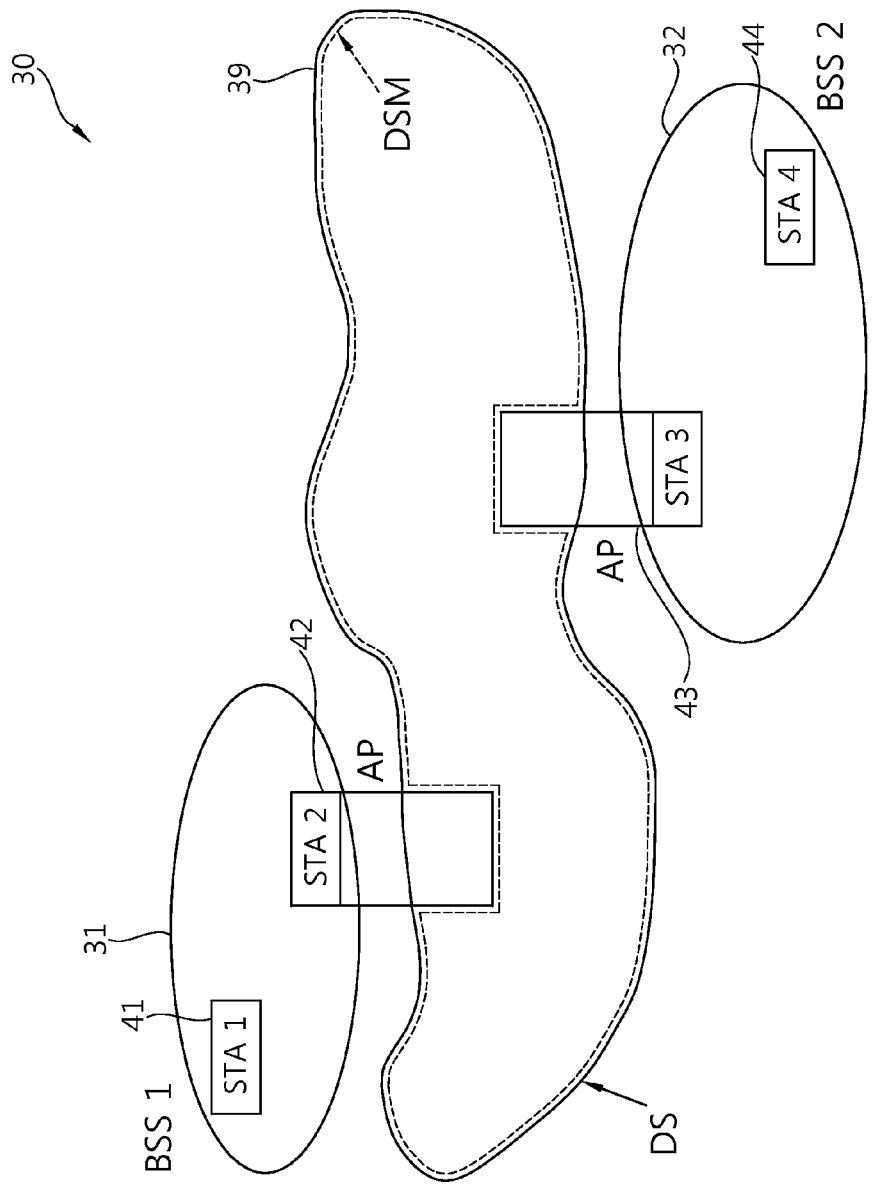
FIG. 2 shows an example of IEEE 802.11 architecture including a distribution system, a distribution system medium, and an AP.

FIG. 2 shows an example of IEEE 802.11 architecture including a distribution system, a distribution system medium, and an AP.

Referring to FIG. 2, the IEEE 802.11 architecture 30 includes two BSSs 31 and 32 and a distribution system 39. The BSS 1 31 includes a non-AP STA 1 41 and an AP STA 2 42, and the BSS 2 32 includes an AP STA 3 43 and a non-AP STA 4 44. The AP STA 2 42 and the AP STA 3 43 manage the non-AP STA 1 41 and the non-AP STA 4 44, respectively. The AP STA 2 42 and the AP STA 3 43 may provide distribution service. The distribution system 39 connects the AP STA 2 42 and the AP STA 3 43.

Figure 3:
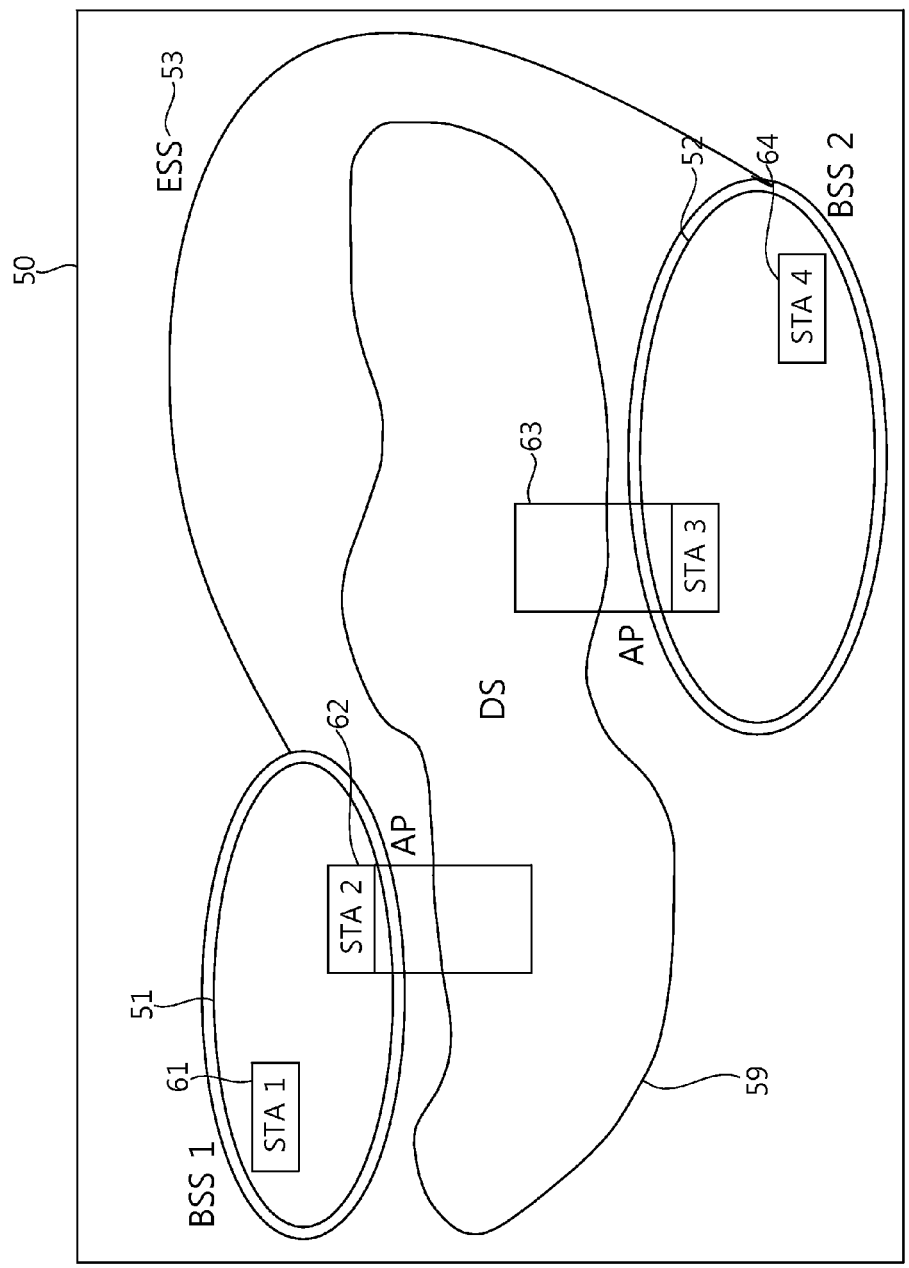
FIG. 3 shows an example of EEE 802.11 architecture including an extended service set (ESS).

FIG. 3 shows an example of EEE 802.11 architecture including an extended service set (ESS).

A plurality of BSSs connected through a distribution system is called an ESS. FIG. 3 is the same as FIG. 2, but FIG. 3 shows that a BSS 1 51 and a BSS 2 52 are elements of an ESS 53. An ESS having a random size may be generated by a distribution system that connects BSSs. An ESS does not include a distribution system. An ESS may be treated as same as an independent BSS for a logical link control (LLC) layer. Accordingly, an AP and/or STAs included in the ESS may communicate with each other. In the same ESS, an STA may move from one BSS to the other BSS while continuously performing communication.

In FIG. 3, the relative physical locations of the BSSs have not been defined in IEEE 802.11. That is, the relative physical locations of the BSSs are not limited. BSSs may be partially overlapped with each other. Accordingly, contiguous coverage can be provided. Alternatively, BSSs may not be physically overlapped with each other. Alternatively, BSSs may be co-located physically. Accordingly, a redundant network can be provided. Alternatively, one or more BSSs or ESSs may be located in the same space as one or more ESSs. This may occur if an ad-hoc network operates at a location where an ESS is present, if IEEE 802.11 networks physically overlapped with each other are established by different types of organization, or if two or more different access and security policies are required at the same location.

Figure 4:
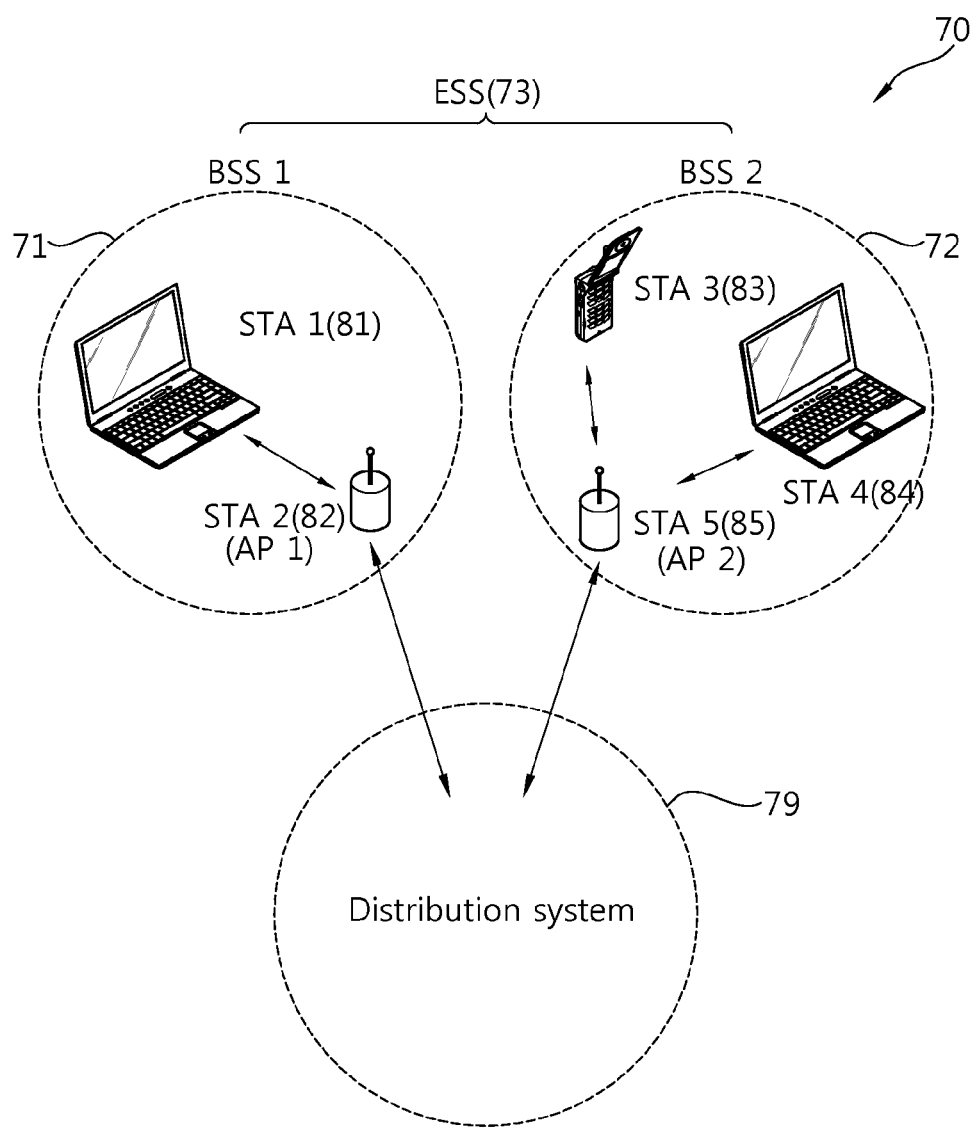
FIG. 4 shows another example of IEEE 802.11 architecture.

FIG. 4 shows another example of IEEE 802.11 architecture.

Referring to FIG. 4, the IEEE 802.11 architecture 70 includes two BSSs 71 and 72 and a distribution system 79. The BSS 1 71 and the BSS 2 72 are elements of the ESS 73. The BSS 1 71 includes an STA 1 81 and an STA 2 81. The BSS 2 72 includes an AP STA 3, an STA 4, and STAs 5 83, 84, and 85. The STA 2 82 and the STA 5 85 are APs. The distribution system 79 connects the STA 2 82 and the STA 5 85.

In a WLAN system according to IEEE 802.11, the basic access mechanism of MAC is a carrier sense multiple access with collision avoidance (CSMA/CA) mechanism. The CSMA/CA mechanism is also called a distributed coordination function (DCF) of IEEE 802.11 MAC and basically adopts a "listen before talk" access mechanism. In accordance with this type of access mechanism, an AP and/or an STA sense a wireless channel or a medium prior to the start of transmission. If, as a result of the sensing, it is determined that the medium is in an idle status, the AP and/or the STA starts the transmission of frames through the corresponding medium. On the other hand, if, as a result of the sensing, the medium is sensed as being an occupied status, the corresponding AP and/or STA do not start its own transmission and set delay duration for accessing the medium and wait.

The CSMA/CA mechanism also includes virtual carrier sensing in addition to physical carrier sensing in which an AP and/or an STA directly senses a medium. Virtual carrier sensing is for supplementing problems that may occur when accessing a medium, such as a hidden node problem. For virtual carrier sensing, the MAC of a WLAN system uses a network allocation vector (NAV). The NAV is a value on which an AP and/or STA which now uses a medium or has rights to use the medium informs another AP and/or STA of the remaining time that the medium becomes available. Accordingly, a value set as an NAV corresponds to duration for which a medium has been scheduled to be used by an AP and/or an STA that sends a corresponding frame.

An AP and/or an STA may perform a procedure for exchanging a request to send (RTS) frame and a clear to send (CTS) frame in order to notify that the AP and/or the STA attempts to access a medium. If the substantial transmission and acknowledgement of a data frame are supported, the RTS frame and the CTS frame include information indicating temporal duration for which a wireless medium necessary to transmit and receive an acknowledgement (ACK) frame has been scheduled for access. An STA that receives an RTS frame transmitted by an AP and/or an STA attempting to transmit a frame or has received a CTS frame transmitted by another STA to which the STA will transmit a frame may be configured to not access a medium for temporal duration indicated by information included in an RTS/CTS frame. This may be implemented by setting an NAV for the duration.

Single-user (SU) multiple-input multiple-output (MIMO) technology in which an AP performs communication by allocating all the antennas of the AP to a single STA increases a channel capacity through a diversity gain using a time space and streams multi-transmission. SU-MIMO technology may contribute to the improvement of performance of a physical layer by extending the degree of space freedom by increasing the number of antennas, as compared with the case where MIMO technology is not used. Furthermore, multi-user (MU)-MIMO technology in which an AP assigns the antennas of the AP to a plurality of STAs may improve the performance of MIMO antennas by increasing a transfer rate per STA or increasing the reliability of a channel through a link layer protocol for multi-access of the plurality of STAs that have accessed the AP.

Link through which a packet is transmitted from an AP to an STA is called downlink (DL). In contrast, link through which a packet is transmitted from an STA to an AP is called uplink (UL). In a DL MU-MIMO environment, STAs may not cooperate with each other because a single AP performs transmission and a plurality of STAs performs reception at the same time. Accordingly, the AP needs to be aware of information about channels, and the AP may precode data based on the channel information and transmit the data. In general, precoding includes a linear precoding scheme and a non-linear precoding scheme. An example of the linear precoding scheme includes a channel inversion method of fully removing interference between STAs. The linear precoding scheme may have a problem of noise enhancement. In order to reduce such a problem, a regularized channel inversion method may be used. The linear precoding scheme is advantageous in that it has lower complexity than the non-linear precoding scheme, but is disadvantageous in that it has relatively low performance. An example of the non-linear precoding scheme includes a vector perturbation method of perturbing transmission data in order to solve the problem of noise enhancement and includes dirty paper coding (DPC) capable of obtaining the entire channel capacity theoretically. The non-linear precoding scheme has relatively more excellent performance than the linear precoding scheme, but has higher complexity than the linear precoding scheme.

In an MIMO environment, how much does an AP accurately know channel information may have a great influence on performance. A method for an STA notifying an AP of channel information includes a channel sounding method and an explicit feedback method. The channel sounding method is a method in which an STA transmits a predetermined pattern to an AP and the AP determines channel information based on the pattern. The channel sounding method may be said to be an implicit feedback method. The explicit feedback method is a method in which an STA informs an AP of channel information, received from the AP, in a data form. In the case of the explicit feedback method, if the number of antennas is increased, the number of STAs for communication is increased. Accordingly, there may be a problem in that the radio resources of UL are occupied because the amount of feedback channel information is increased. Furthermore, in general, it is difficult for an AP to know entire channel information. Accordingly, a method for determining a beam preferred by an STA and informing an AP of information about a corresponding beamforming matrix or a method using a beam or codebook pre-determined between an AP and STAs may be used instead of a precoding scheme using channel information without change. In the method using a beam or codebook pre-determined between an AP and STAs, STAs select a beam having the highest signal to interference noise ratio (SINR) and transmit the selected beam to an AP along with the corresponding beam index. The AP may be the best STA in each beam. Such a method is advantageous in that feedback information is relatively simple, but may have a problem in that performance is sharply reduced when the number of STAs is small. In contrast, the method for determining a beam preferred by an STA and informing an AP of information about a corresponding beamforming matrix does not have much lower performance than the channel sounding method and does not require calibration.

In UL MU-MIMO environment, a problem of channel feedback is smaller than that DL MU-MIMO environment because a plurality of STAs performs transmission and a single AP performs reception. However, a method of performing, by an AP, reception synchronization between STAs and a power control method for preventing the deterioration of performance when there is a great difference in reception power between STAs may be required.

In IEEE 802.11ac, in order to transmit a packet, a physical layer service data unit (PSDU) is generated, and a physical layer convergence procedure (PLCP) protocol data unit (PPDU) is generated by adding a PLCP preamble to the PSDU. The PLCP preamble is used for a reception side to demodulate the PSDU. A single PPDU format may be defined for a single PLCP.

Figure 5:
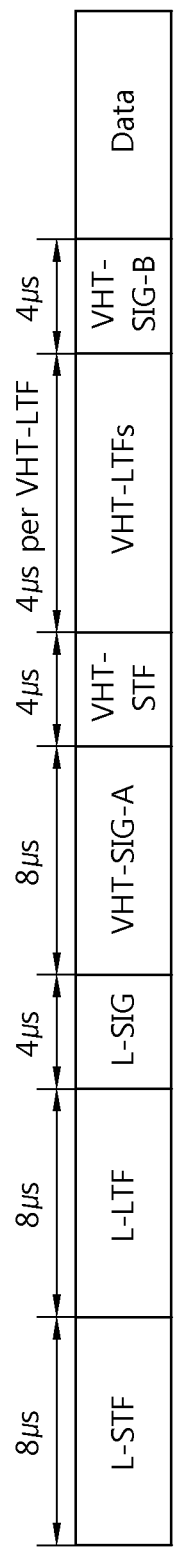
FIG. 5 shows an example of a VHT PPDU format.

FIG. 5 shows an example of a VHT PPDU format.

Referring to FIG. 5, the VHT PPDU format includes a legacy short training field (L-STF), a legacy long training field (L-LTF) field, a legacy signal (L-SIG) field, a VHT-SIG-A field, a VHT-STF, the VHT-LTFs, a VHT-SIG-B field, and a data field. The L-STF, the L-LTF, and the L-SIG field are fields used in an existing legacy WLAN system, and the VHT-SIG-A field, the VHT-STF, the VHT-LTFs, and the VHT-SIG-B field are fields that are present only in a VHT packet.

The VHT-SIG-A field carries information for describing a VHT format packet and carries information that is equally required by all STAs. The VHT-SIG-A field may include a VHT-SIG-A1 field and a VHT-SIG-A2 field. The VHT-SIG-A1 field may include information about the bandwidth of a used channel, whether or not space time block coding (STBC) has been applied, a group identifier (ID) indicating of a group that is used for the transmission of STAs grouped in MU-MIMO, and the number of used streams. The VHT-SIG-A2 field may include information about a short guard interval (GI), forward error correction (FEC), and a modulation and coding scheme (MCS) for a single user, information about the type of channel coding for multiple users, information related to beamforming, redundancy bits for cyclic redundancy checking (CRC), and the tail bits of a convolutional decoder. The VHT-STF may be used to improve automatic gain control estimation in an MIMO environment. The VHT-LTF is used to estimate a channel in an MIMO environment. The VHT-SIG-B field may include information about each STA, that is, information about the length of a PSDU and an MCS, and tail bits.

Figure 6:
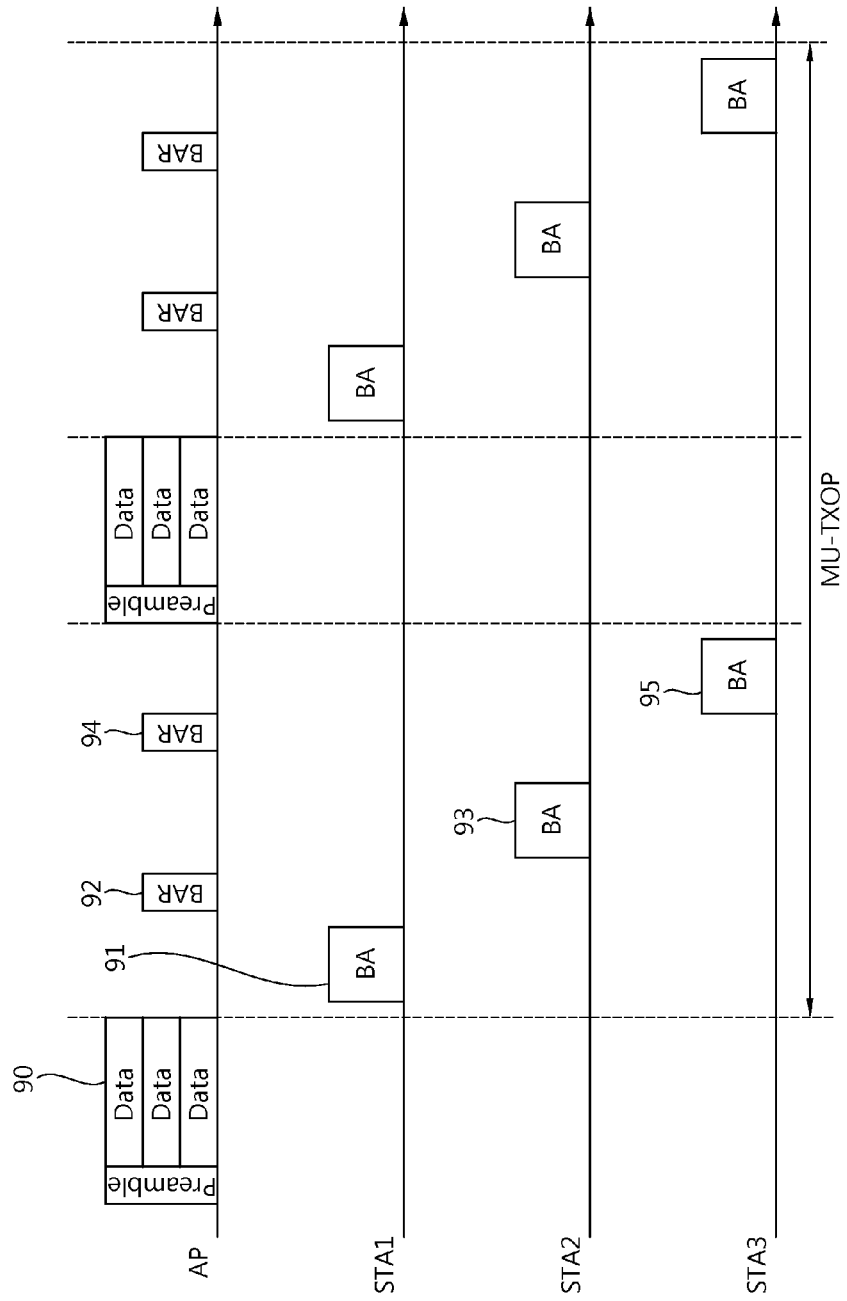
FIG. 6 shows an example of an MU-MIMO transmission process in IEEE 802.11 ac.

FIG. 6 shows an example of an MU-MIMO transmission process in IEEE 802.11ac.

First, an AP transmits data to each STA along with a preamble (90). An STA 1 that has received the data and the preamble transmits a block acknowledgement (BA) to the AP (91). As a response, the AP transmits a block acknowledgement request (BAR) to the STA 1 (92). Thereafter, an STA 2, that is, a next STA, transmits a BA to the AP (93), and the AP transmits a BAR to the STA 2 (94). Thereafter, an STA 3, that is, a next STA, transmits a BA to the AP (95). When such a process is performed on all STAs, the AP transmits a next PDU.

Meanwhile, if MU-MIMO technology is applied to IEEE 802.11ac, an AP may need to inform corresponding STAs that data is transmitted through a specific spatial stream in order to support MU-MIMO, and the corresponding STAs are required to actually receive data through the corresponding spatial stream. To this end, a signal indicating STAs that need to receive through MU-MIMO and a signal indicating the number of spatial streams according to the locations of the spatial streams regarding the signal that needs to be received by the corresponding STAs may be included in a VHT-specific signal within the PLCP preamble header of each frame transmitted through MU-MIMO. The signal indicating STAs that need to perform reception through MU-MIMO may be called a group ID indicator, and the signal indicating the number of spatial streams may be called a spatial stream indicator.

Figure 7:
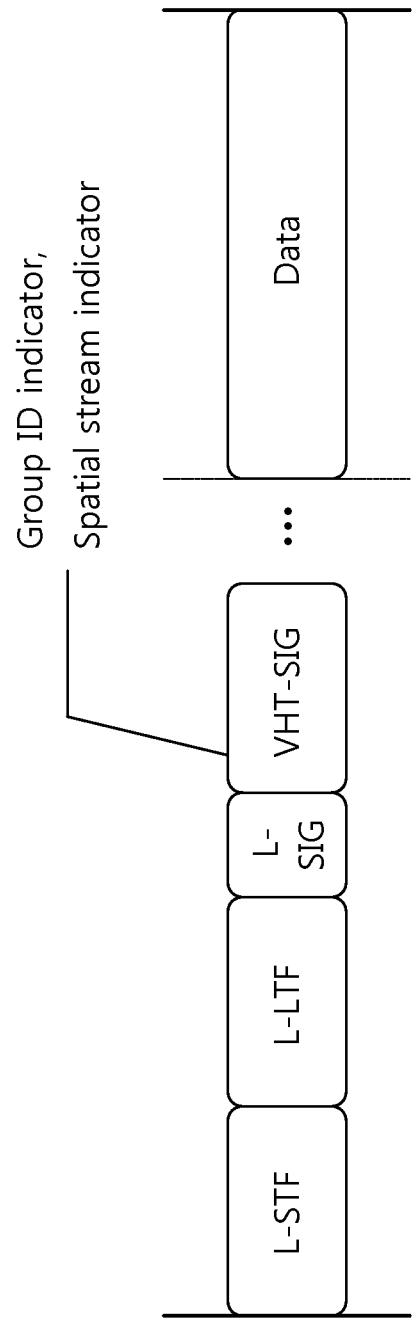
FIG. 7 shows an example of a VHT PPDU format including a group ID indicator.

FIG. 7 shows an example of a VHT PPDU format including a group ID indicator.

The VHT-SIG field of the VHT PPDU format in FIG. 7 may include a group ID indicator and a spatial stream indicator. The group ID indicator may carry information about whether what STAs have to receive MU-MIMO transmission transmitted by an AP, and each group ID and each STA may be logically connected. Before performing the MU-MIMO transmission, the AP may indicate STAs connected to a specific group ID through a group ID management frame.

FIG. 8 shows an example of structure of a group ID management frame.

FIG. 8-(a) shows an example of the structure of the group ID management frame. The group ID management frame may be transmitted by an AP in order to assign or change the location of a user corresponding to one or more group IDs. The AP may transmit the group ID management frame to each of grouped STAs in a unicast manner. The group ID management frame includes a group ID management information element. FIG. 8-(b) shows an example of the structure of the group ID management information element. The group ID management information element includes an element ID, a length, and a spatial stream location for each group ID.

The group ID management frame indicates whether or not a corresponding STA has belonged to each group for all group IDs and indicates what place is a spatial stream located if a corresponding STA belongs to a corresponding group. For example, if a value of the spatial stream location in a group ID management information element received by an STA is 0, 1, 2, 4, 0, 0, 0, . . . , 0, 0, 0, the group ID management information element indicates that the corresponding STA belongs to a group ID 2, a group ID 3, and a group ID 4. Furthermore, the group ID management information element indicates that the location of the spatial stream is the first in the group ID 2, that the location of the spatial stream is the second in the group ID 3, and that the location of the spatial stream is the fourth in the group ID 4. The location of a spatial stream means that an STA has to receive a signal at the location corresponding to the location of the corresponding spatial stream when the STA receives a frame having a corresponding group ID. Accordingly, if the STA receives a frame having the group ID 3, the corresponding STA receives a signal corresponding to the second spatial stream. If the STA receives a frame having the group ID 4, the corresponding STA receives a signal corresponding to the fourth spatial stream. If the STA receives the frame having the group ID 1, the corresponding STA neglects the corresponding frame because it does not belong to the group ID 1.

Hereinafter, a method for determining, by an AP, STAs performing transmission at the same time in an UL MU-MIMO environment according to the present invention is described.

Figure 9:
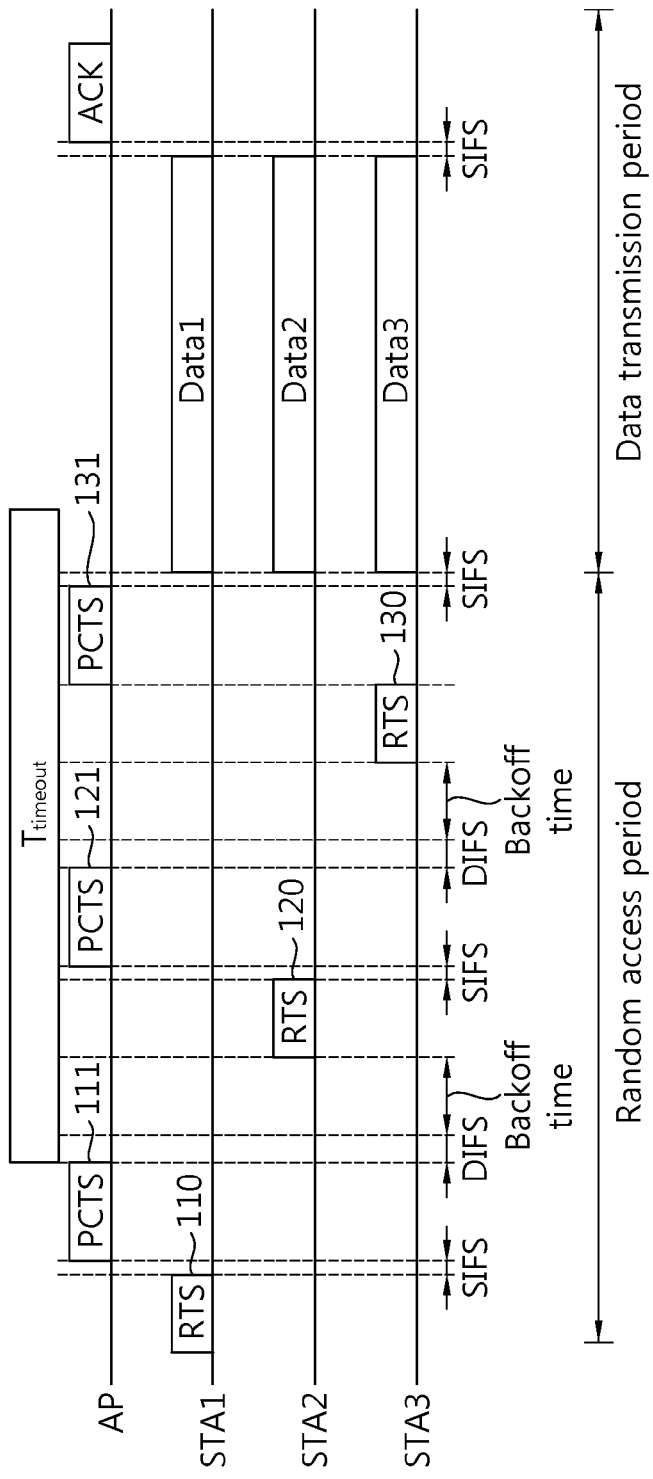
FIG. 9 shows an example of an existing method for determining, by an AP, determining STAs performing transmission at the same time.

FIG. 9 shows an example of an existing method for determining, by an AP, determining STAs performing transmission at the same time.

As the most basic method, the AP may continuously recognize STAs that try to perform transmission at the same time in UL-MIMO. Referring to FIG. 9, first, an STA1 transmits an RTS frame to the AP (110), and the AP transmits a PCTS frame to the STA1 as a response thereto (111). Next, an STA2 transmits an RTS frame to the AP (120), and the AP transmits a PCTS frame to the STA2 as a response thereto (121). Next, an STA3 transmits an RTS frame to the AP (130), and the AP transmits a PCTS frame to the STA3 as a response thereto (131). That is, the above method is the same as that an existing CSMA/CA method is sequentially performed. If an AP receives RTS frames transmitted by respective STAs and continuously recognizes STAs that try to perform transmission at the same time as described above, overhead may be increased as the number of STAs is increased. Furthermore, overhead resulting from a collision may be increased because a contention interval needs to be experienced each time whenever a single STA is selected. Accordingly, there may be a need for a method for selecting several STAs at the same time not a single STA at once.

The present invention provides a method for transmitting a single tone frame as a method for selecting STAs that try to perform simultaneous transmission in UL MU-MIMO. The tone may indicate a single subcarrier. Furthermore, the present invention also provides a frame transmission method supporting a legacy STA, that is, backward compatibility. In the following embodiments, M indicates the number of antennas of an AP. M may be 2. K indicates the number of STAs that may be supported by an AP at once. Assuming that an AP uses a minimum mean square error (MMSE) filter, it may be assumed that K is smaller than or equal to M. Furthermore, each STA is assumed to have a single antenna.

Figure 10:
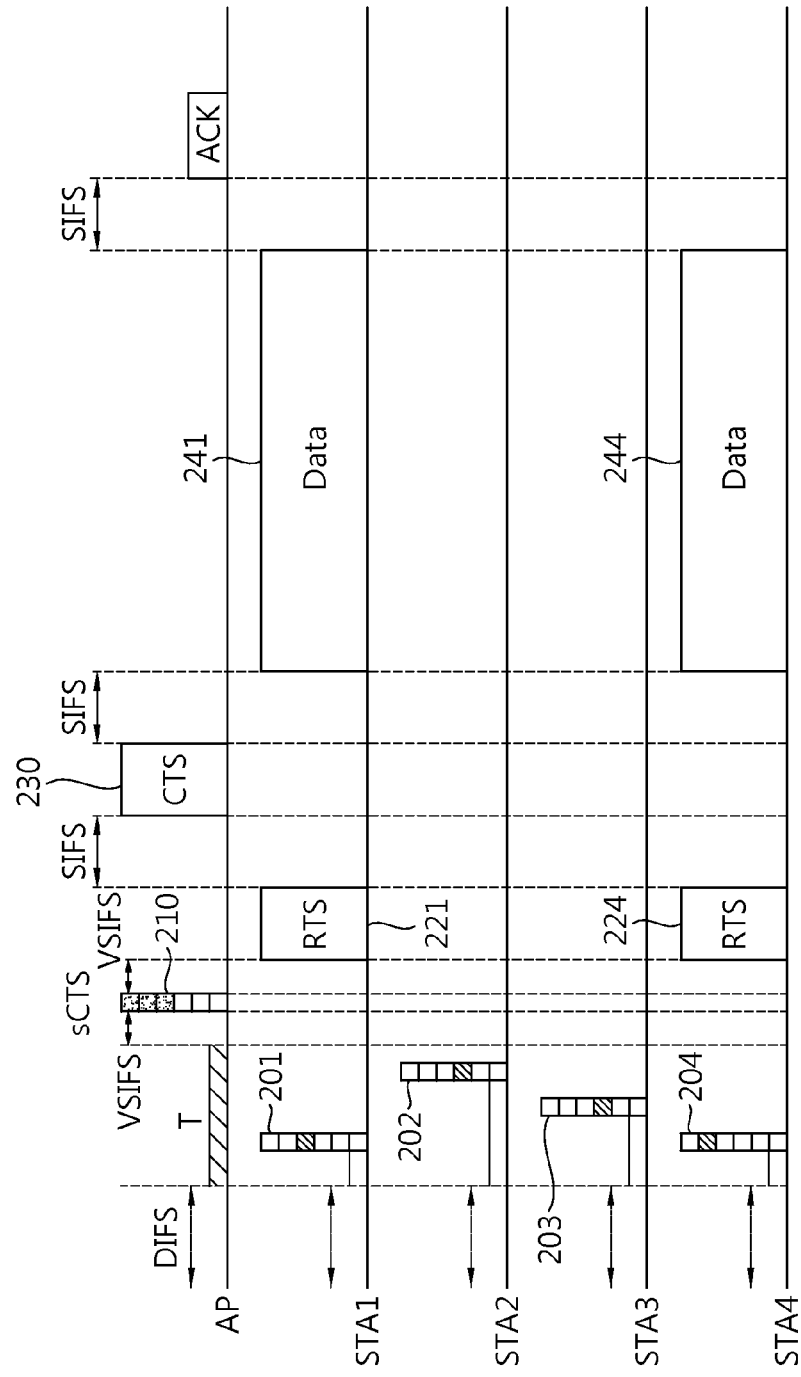
FIG. 10 shows an embodiment of a method for transmitting a frame according to the present invention.

FIG. 10 shows an embodiment of a method for transmitting a frame according to the present invention.

Like in the existing CSMA/CA method, when a channel becomes a free state, each STA experiences random backoff after a distributed coordination function (DCF) inter-frame space (DIFS) and transmits a single tone RTS (sRTS) frame to an AP. The sRTS frame is a signal that requests access from the AP, and it does not include information about a user unlike the existing RTS frame. Unlike the existing RTS frame, the sRTS frame occupies only a single OFDM symbol and may assign power to only one subcarrier of a single OFDM symbol using an on-off method. Referring to FIG. 10, an STA1 transmits a first sRTS frame to an AP using a third subcarrier (201), an STA2 transmits a second sRTS frame to the AP using a fourth subcarrier (202), an STA3 transmits a third sRTS frame to the AP using the fourth subcarrier (203), and an STA4 transmits a fourth sRTS frame to the UE using a second subcarrier (204). The sRTS frames are not temporally overlapped with each other. The subcarrier selected by each of the STAs may be randomly determined each time.

The AP receives the sRTS frames from the respective STAs and transmits a single tone CTS (sCTS) frame to the STAs as responses thereto (210). The AP may select STAs that perform transmission at the same time in UL MU-MIMO, and may inform the STAs of this fact through the sCTS frame. That is, the AP may inform the STAs that what STAs have been selected by assigning power to the same subcarriers as those to which the selected STAs have assigned power in order to transmit their sRTS frames and transmitting the sCTS frame. In this case, since an on-off method is used in a single tone frame, the sRTS frames and the sCTS frame need to be distinguished from each other. The first subcarrier of the single tone frame may be used to distinguish the sRTS frames and the sCTS frame. That is, if power is not assigned to the first subcarrier of the single tone frame, it may indicate an sRTS frame. If power is assigned to the first subcarrier of the single tone frame, it may indicate an sCTS frame.

In FIG. 10, the AP assigns power to the first to the third subcarriers and transmits the sCTS frame. It can be seen that the sCTS frame is transmitted because power is assigned to the first subcarrier. Furthermore, it can be seen that STAs that have transmit the sRTS frames by assigning power to the second and third subcarriers have been selected because power is assigned to the second and the third subcarriers. An STA that belongs to STAs that have transmit sRTS frames through one of the second and the third subcarriers is the STA1 and the STA4. That is, it can be seen that the STA1 and the STA4 have been selected as STAs that will perform simultaneous transmission in UL MU-MIMO.

Meanwhile, since a frame that uses a single tone is newly defined, a time interval called a very short inter-frame space (VSIFS) other than the existing DIFS and short inter-frame space (SIFS) may be newly defined. The VSIFS indicates the time that is taken to detect a single tone frame and to respond thereto after the single tone frame is transmitted. The VSIFS may be defined as an interval smaller than the existing DIFS or SIFS.

After transmitting the sCTS frame, the AP may be aware that how many STAs can be supported. Accordingly, each STA may exchange the RTS frame and the CTS frame according to the existing CSMA/CA method and may transmit data to the AP. That is, STAs that have received the sCTS frame may determine whether or not each STA is allowed to transmit its signal, and thus each STA may transmit the RTS frame including information about a user. Referring to FIG. 10, the STA1 and the STA4 selected by the AP transmit the respective RTS frames to the AP (221, 224), and the AP transmits the CTS frame as responses thereto (230). The STA1 and the STA4 transmit their data to the AP (241, 244).

Figure 11:
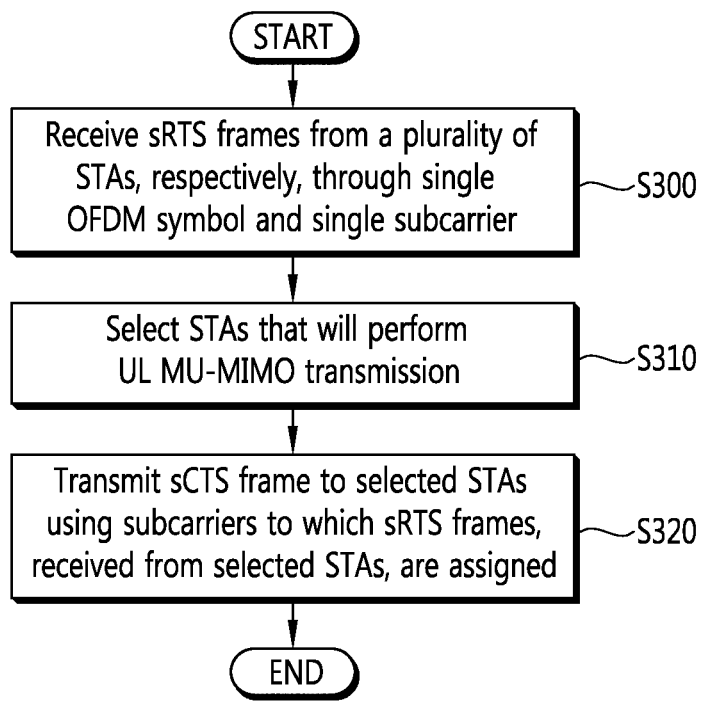
FIG. 11 shows another embodiment of a method for transmitting a frame according to the present invention.

FIG. 11 shows another embodiment of a method for transmitting a frame according to the present invention.

At step S300, an AP receives sRTS frames from a plurality of STAs, respectively, through a single OFDM symbol and a single subcarrier. At step S310, the AP selects STAs that will perform UL MU-MIMO transmission. At step S320, the AP transmits an sCTS frame using the same subcarriers as those to which the sRTS frames received from the selected STAs have been assigned.

Figure 12:
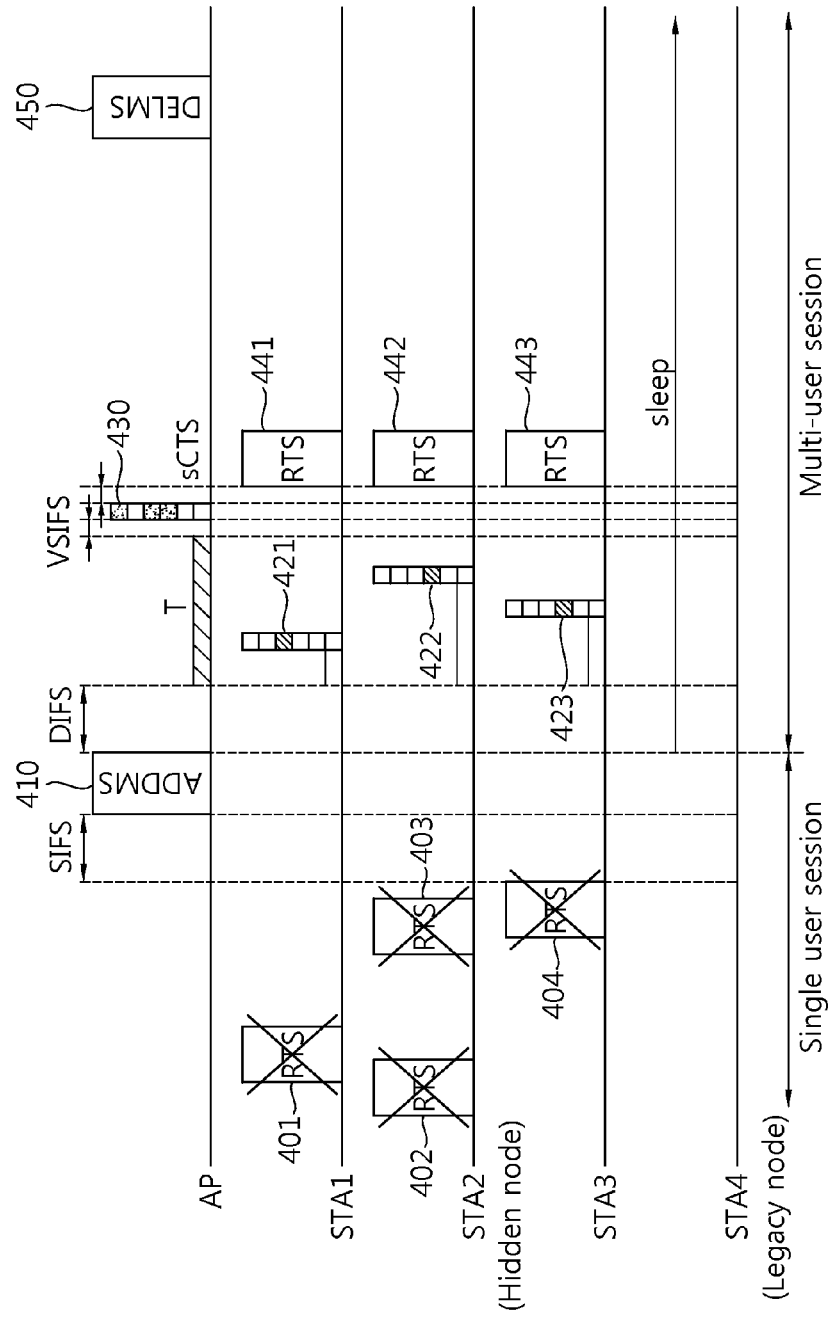
FIG. 12 shows another embodiment of a method for transmitting a frame according to the present invention.

FIG. 12 shows another embodiment of a method for transmitting a frame according to the present invention.

A single user session may be first performed in order to support legacy STAs and to perform timing synchronization, along with a method of transmitting a single tone frame and selecting STAs that will perform UL MU-MIMO transmission. The AP may perform a single user session earlier than a multi user session on behalf of legacy STAs incapable of UL MU-MIMO transmission because the AP is not precisely aware of the number of STAs with which the AP will perform communication. If a multi user session is directly performed without a single user session, the legacy STAs are unable to access the AP and the transmission of a single tone frame by STAs capable of UL MU-MIMO transmission may be hindered. Accordingly, the AP may first perform a single user session, and may support only a single STA if only the single STA has accessed the AP. Only when a plurality of STAs collides with each other, the AP may perform a multi user session. When the single user session and the multi user session are defined, the AP may transmit an add multiuser session (ADDMS) frame indicating that a session has changed into the multi user session and a delete multiuser session (DELMS) frame indicating that the multi-user session has been terminated. If a single tone frame is used, a problem in that overhead is increased when the number of STAs is reduced may occur. Such a problem may be supplemented through a single user session.

Referring to FIG. 12, first, a single user session is performed. An STA1 and an STA3 transmit RTS frames to an AP (401, 402, 403, and 404). An STA2 may be a hidden node, and an STA4 may be a legacy node. Since RTS frames transmitted by a plurality of STAs collide with each other in the single user session, the plurality of STAs is unable to access the AP. Accordingly, after an SIFS, the AP transmits an ADDMS frame and changes the single user session into a multi user session (410). The STA4, that is, the legacy node, switches to sleep mode because it is unable to perform the multi user session.

After a DIFS, the multi user session is performed based on a single tone frame. The STA1 transmits a first sRTS frame to the AP using a third subcarrier (421), the STA2 transmits a second sRTS frame to the AP using a fourth subcarrier (422), and the STA3 transmits a third sRTS frame to the AP using the fourth subcarrier (423). The sRTS frames are not temporally overlapped with each other. After a VSIFS, the AP transmits an sCTS frame (430). The AP assigns power to the first subcarrier in order to indicate that a frame is the sCTS frame and also assigns power to the third and the fourth subcarriers. Accordingly, it can be seen that the STA1, the STA2, and the STA3 have been selected for UL MU-MIMO transmission.

The selected STA1, STA2, and STA3 transmit respective RTS frames to the AP (441, 442, and 443). The AP terminates the multi user session by transmitting a DELMS frame (450).

Meanwhile, if a single tone frame is used, a probability that a collision may occur may be reduced as compared with the existing CSMA/CS method. If STAs are accessed randomly, however, a collision is inevitable. Accordingly, a method for checking, by an AP, whether or not a collision has occurred, selecting STAs that will perform UL MU-MIMO transmission, and allowing access may be proposed.

Figure 13:
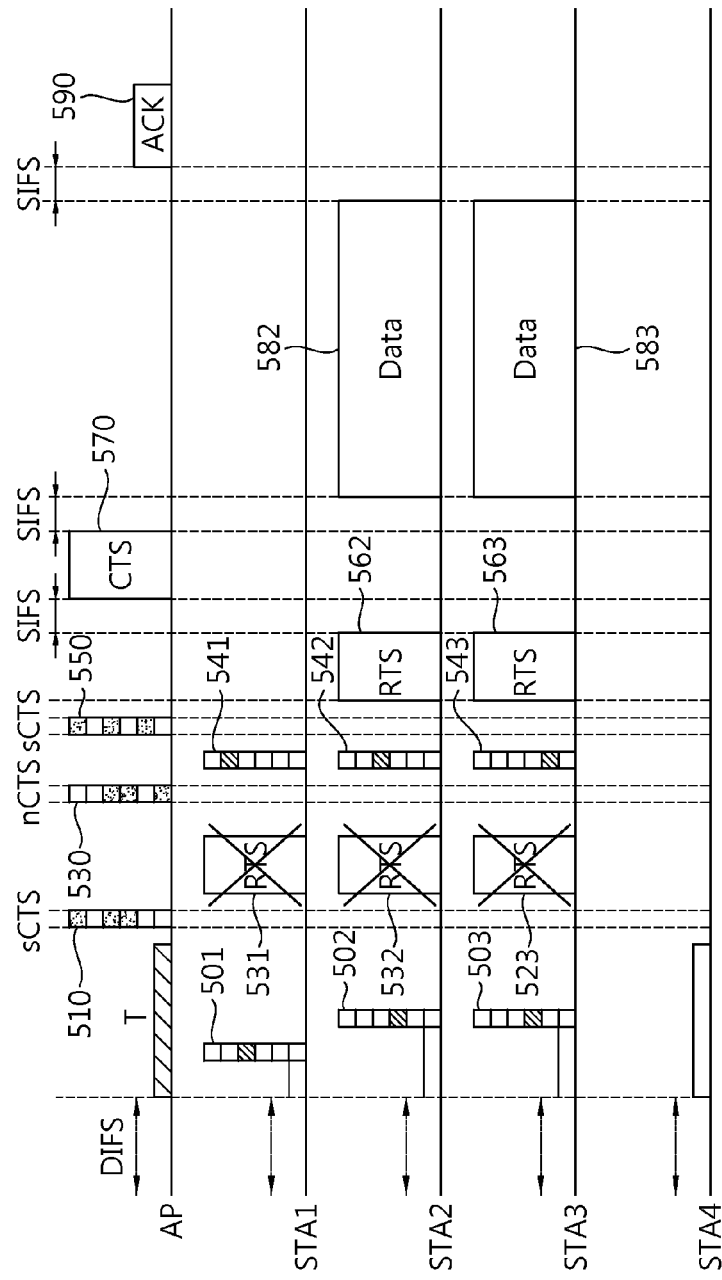
FIG. 13 shows another embodiment of a method for transmitting a frame according to the present invention.

FIG. 13 shows another embodiment of a method for transmitting a frame according to the present invention.

After a DIFS, an STA1 transmits a first sRTS frame to an AP using a third subcarrier (501), an STA2 transmits a second sRTS frame to the AP using a fourth subcarrier (502), and an STA3 transmits a third sRTS frame to the AP using the fourth subcarrier (503). In this case, the second sRTS frame and the third sRTS frame collide with each other because they are transmitted through the same subcarrier in the same OFDM symbol.

The AP assigns power to the third and the fourth subcarriers and transmits an sCTS frame to the STAs (510). If a single tone frame is used, an AP detects a plurality of sRTS frame as a single sRTS frame although the plurality of sRTS frame is overlapped with each other and transmitted. Thus, the AP is unable to determine whether or not a collision has occurred between a plurality of STAs using only the sRTS frame. As the AP assigns power to the third and the fourth subcarriers and transmits the sCTS frame to the STAs, all the STA1 to the STA3 transmit the RTS frames to the AP at the same time, and the AP fails in detecting the RTS frames transmitted by the STAs (531, 532, and 533). Accordingly, the AP may be aware that a collision has occurred between the STAs.

The AP transmits a negative CTS (nCTS) frame, indicating whether a collision occurs or not, to the STAs. In this case, the last subcarrier of a single tone frame may be use to identify the nCTS frame. That is, when power is assigned to the last subcarrier of the single tone frame, it may indicate an nRTS frame. STAs that have received the nCTS frame randomly determine tones and transmit the first sRTS frame, the second sRTS frame, and the third sRTS frame, respectively, to the AP (541, 542, and 543). Such a process may be repeated until a collision does not occur.

When a collision does not occur, the AP assigns power to the third and the fifth subcarriers and transmits an sCTS frame to the STAs (550). The STA2 and the STA3 transmit respective RTS frames to the AP (562 and 563). The AP transmits the CTS frame to the STAs (570), and the STA2 and the STA3 transmit data to the AP (582 and 583).

If an AP transmits an nCTS frame to STAs when a collision occurs, and the STAs randomly determine tones to transmit sRTS frames as described above, there is a disadvantage in that a probability that a collision may occur is the same whenever such a process is repeated. Accordingly, there may be proposed a method for using, each of STAs that have received an nCTS frame, two OFDM symbols when transmitting an sRTS frame again.

Figure 14:
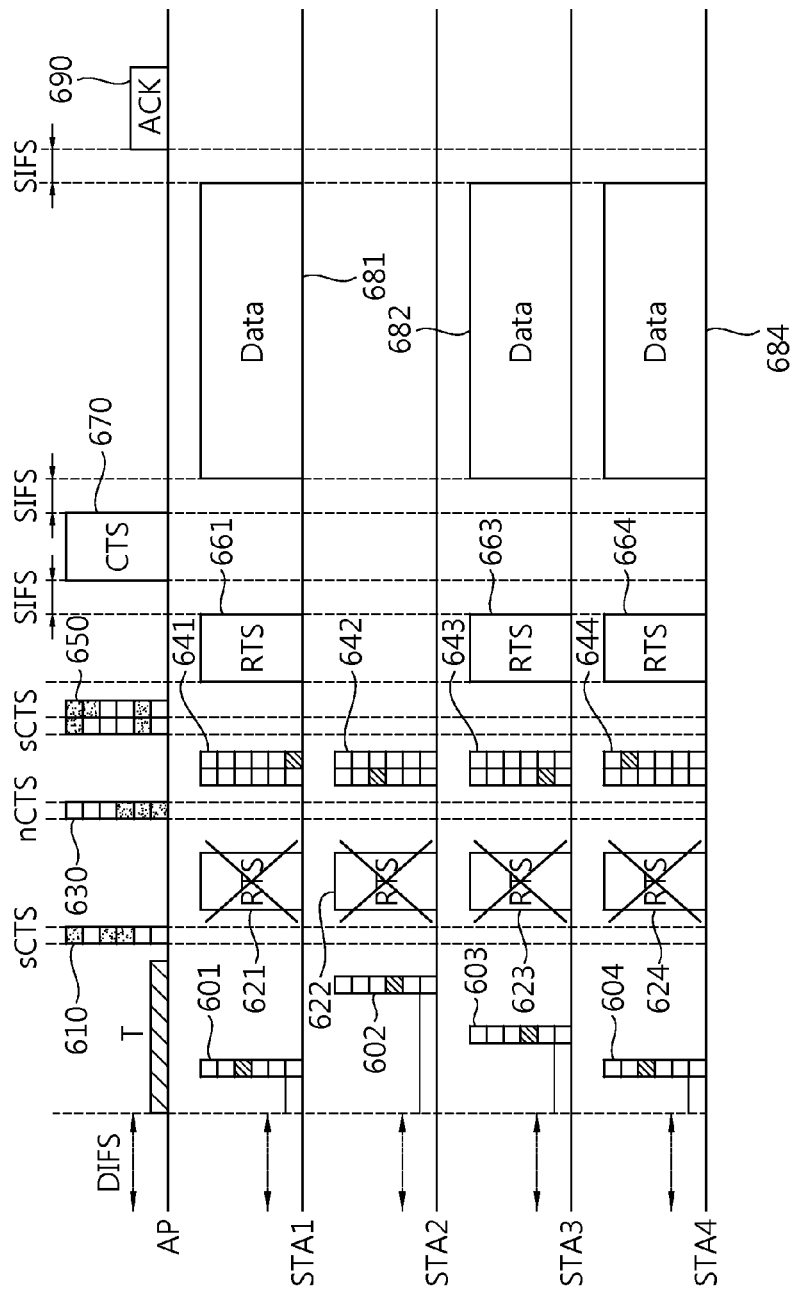
FIG. 14 shows another embodiment of a method for transmitting a frame according to the present invention.

FIG. 14 shows another embodiment of a method for transmitting a frame according to the present invention.

After a DIFS, an STA1 transmits a first sRTS frame to an AP using a third subcarrier (601), an STA2 transmits a second sRTS frame to the AP using a fourth subcarrier (602), an STA3 transmits a third sRTS frame to the AP using the fourth subcarrier (603), and an STA4 transmits a fourth sRTS frame to the AP using the third subcarrier (604). In this case, the first sRTS frame and the fourth sRTS frame collide with each other because they are transmitted through the same subcarrier of the same OFDM symbol. The AP assigns power to the third and the fourth subcarriers and transmits the sCTS frame to the STAs (610). Since the AP assigns power to the third and the fourth subcarriers and transmits the sCTS frame to the STAs, all the STA1 to the STA3 transmit respective RTS frames to the AP at the same time, and the AP fails in detecting the RTS frames transmitted by the STAs (621, 622, 623, and 624). Accordingly, the AP may be aware that a collision has occurred between the STAs. The AP transmits an nCTS frame, indicating whether or not a collision has occurred, to the STAs (630). The AP may indicate the nRTS frame by assigning power to the last subcarrier of the single tone frame.

The STAs that have received the nCTS frame randomly determine respective tones again and transmit a first sRTS frame, a second sRTS frame, a third sRTS frame, and a fourth sRTS frame, respectively, to the AP (641, 642, 643, 644). In this case, unlike in the case where sRTS frames are first transmitted, two OFDM symbols may be used. The first sRTS frame may be transmitted through the last subcarrier of the second OFDM symbol, the second sRTS frame may be transmitted through the third subcarrier of the first OFDM symbol, the third sRTS frame may be transmitted through the fifth subcarrier of the first OFDM symbol, and the fourth sRTS frame may be transmitted through the second subcarrier of the second OFDM symbol. Since the STAs transmit the sRTS frames again using the two OFDM symbols after receiving the nCTS frame, the number of tones that may be randomly selected is doubled. Accordingly, a probability that a collision may occur between the STAs can be significantly reduced. An sCTS frame and an nCTS frame using two OFDM symbols may be used in accordance with the sRTS frames using the two OFDM symbols. Such a process may be repeated until a collision does not occur. If a collision occurs although the two OFDM symbols are used, the sRTS frame and the nCTS frame may be transmitted using the two OFDM symbols without change, or the number of OFDM symbols may be increased to 3 and the sRTS frame and the nCTS frame may be transmitted using the 3 OFDM symbols. This may be determined by a system.

If a collision does not occur, the AP assigns power to the fifth subcarrier of the first OFDM symbol and the second and the fifth subcarriers of the second OFDM symbol and transmits the sCTS frame to the STAs (650). The selected STA1, STA3, and STA4 transmit respective RTS frames to the AP (661, 663, and 664). The AP transmits a CTS frame to the STAs (670), and the STA1, the STA3, and the STA4 transmit their data to the AP (681, 683, and 684).

Figure 15:
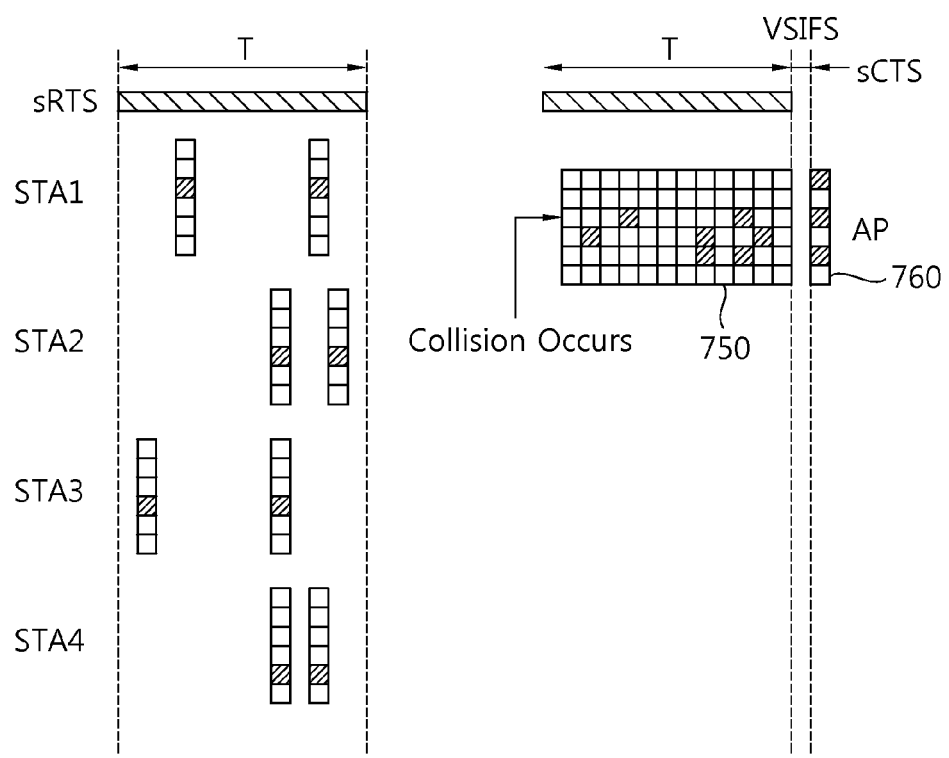
FIG. 15 shows another embodiment of a method for transmitting a frame according to the present invention.

FIG. 15 shows another embodiment of a method for transmitting a frame according to the present invention.

In order to reduce a collision between STAs, a single STA may transmit the same sRTS frame. Accordingly, although an AP receives the sRTS frame using the same tone on the same time, a probability that a collision may occur can be reduced. For example, in FIG. 15, when an STA2 and an STA3 transmit an sRTS frame using the same tone in the same OFDM symbol, an AP may be aware that a collision has occurred by detecting the third sRTS frame (750). Accordingly, the AP may select other STAs except STAs among which a collision has occurred. That is, the AP may select an STA1 and an STA4 and transmit an sCTS frame (760). In the present embodiment, the sRTS frame has been assumed to be transmitted twice, but each STA may repeatedly transmit the sRTS frame two or more times. This may be adaptively determined by a system.

Figure 16:
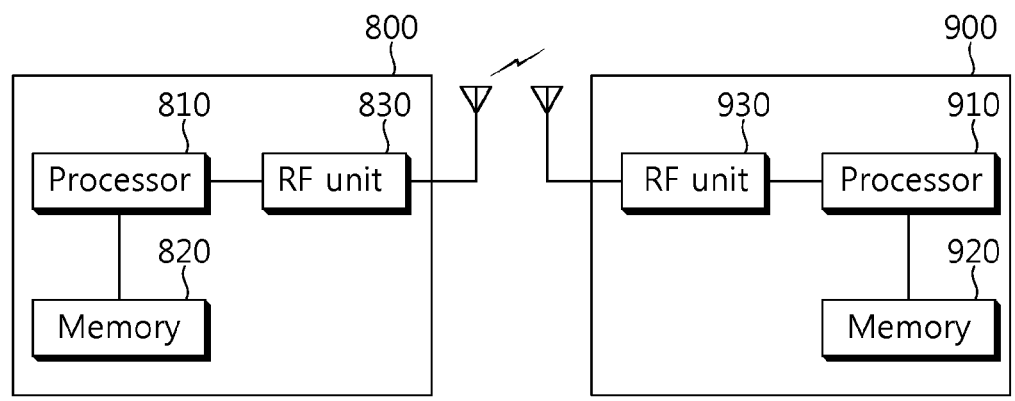
FIG. 16 is a block diagram of a wireless communication system to implement an embodiment of the present invention.

FIG. 16 is a block diagram of a wireless communication system to implement an embodiment of the present invention.

An AP 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A STA 900 includes a processor 910, a memory 920, and an RF unit 930. The processor 910 may be configured to implement proposed functions, procedures, and/or methods in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processor 810, 910 may include application-specific integrated circuit (ASIC), other chipset, logic circuit and/or data processing device. The memory 820, 920 may include read-only memory (ROM), random access memory (RAM), flash memory, memory card, storage medium and/or other storage device. The RF unit 830, 930 may include baseband circuitry to process radio frequency signals. When the embodiments are implemented in software, the techniques described herein can be implemented with modules (e.g., procedures, functions, and so on) that perform the functions described herein. The modules can be stored in memory 820, 920 and executed by the processor 810, 910. The memory 820, 920 can be implemented within the processor 810, 910 or external to the processor 810, 910 in which case those can be communicatively coupled to the processor 810, 910 via various means as is known in the art.

Figure 17:
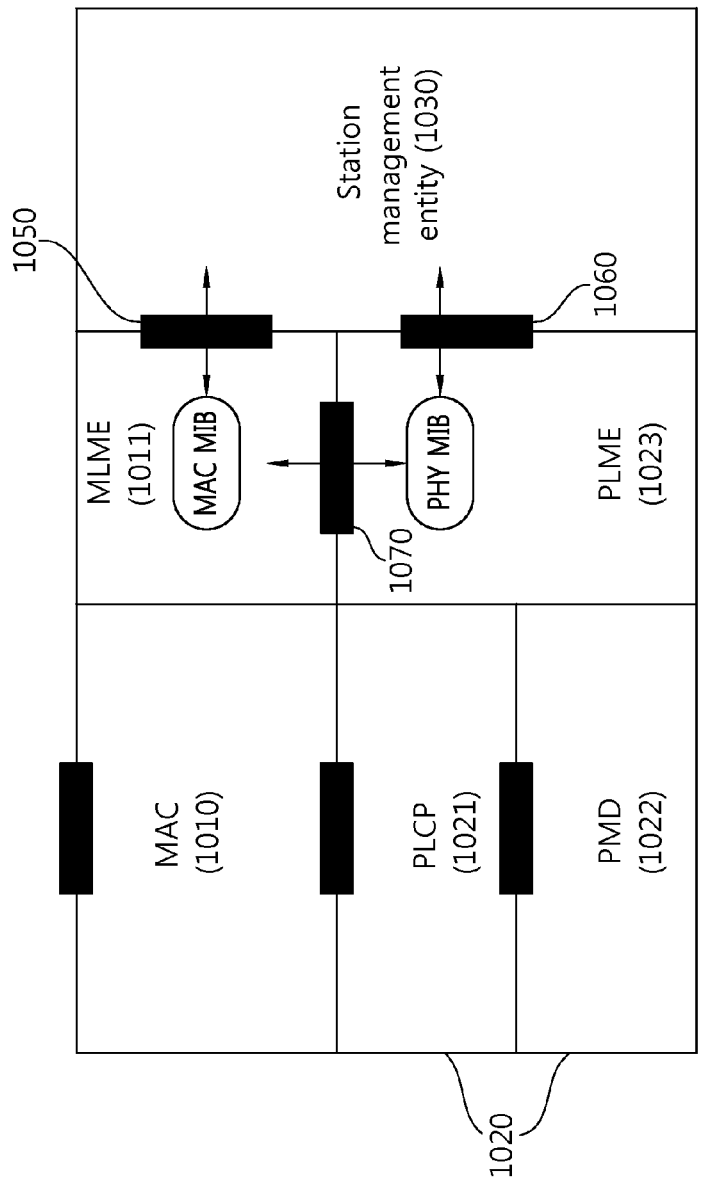
FIG. 17 shows an example of a processor to implement an embodiment of the present invention.

FIG. 17 shows an example of a processor to implement an embodiment of the present invention.

FIG. 17 shows an example of the structure of a processor 800 of the AP of FIG. 16 and/or the structure of a processor 900 of the STA of FIG. 16. The processor may have a plurality of hierarchical structures. In particular, FIG. 17 shows only a MAC sublayer 1010 on the data link layer (DLL) and a physical layer 1020, among a plurality of layers.

Referring to FIG. 17, the physical layer 1020 includes a PLCP entity 1021 and a physical medium dependent (PMD) entity 1022. The MAC sublayer 1010 and the physical layer 1020 are management entities and each includes an MAC sublayer management entity (MLME) 1011 and a physical layer management entity (PLME) 1023. The MLME 1011 and the PLME 1023 provide a layer management service interface.

For a correct MAC operation, a station management entity (SME) 1030 is present within each STA. The SME 1030 is an entity independent from the layer and may be considered to be an entity present in a separate management plane. The SME 1030 may function to collect layer-dependent statuses from a plurality of layer management entities (LMEs) and to set values of hierarchical-specific parameters. The SME 1030 may perform such a function in lieu of general system management entities and implement a standard management protocol.

The MLME 1011 and the SME 1030 may communicate with each other through the MLME-SAP 1050. The PLME 1023 and the SME 1030 may communicate with each other through the PLME-SAP 1060. The MLME 1011 and the PLME 1023 may communicate with each other through the MLME-PLME-SAP 1070.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method of transmitting, by an access point (AP), a frame in a wireless local area network (WLAN) system, the method comprising:
   receiving single-tone request to send (sRTS) frames from a plurality of stations (STAs) respectively through one orthogonal frequency division multiplexing (OFDM) symbol and one subcarrier;
   selecting STAs that will perform uplink (UL) multi user (MU) multiple-input multiple-output (MIMO) transmission; and
   transmitting single-tone clear to send (sCTS) frames allocated to the same subcarrier to which sRTS frames received from the selected STAs have been allocated to the plurality of STAs.

2. The method of claim 1, wherein the sRTS frames and the sCTS frames are indicated based on a first subcarrier.

3. The method of claim 1, wherein the one subcarrier on which the sRTS frames are transmitted by each of the plurality of STAs is randomly determined.

4. The method of claim 1, further comprising:
   receiving RTS frames from the selected STAs, and
   transmitting CTS frames to the selected STAs.

5. The method of claim 4, wherein the RTS frames are received after a very short inter-frame space (VSIFS) time since the sCTS frames are transmitted.

6. The method of claim 1, wherein the sCTS frames are transmitted after a VSIFS time since the sRTS frames are received.

7. The method of claim 1, further comprising:
   performing a single user session that supports communication of a single STA in advance.

8. The method of claim 7, further comprising:
   transmitting an add multiuser session (ADDMS) frame that changes the single user session into a multi user session.

9. The method of claim 1, further comprising:
   transmitting negative CTS (nCTS) frames, indicating that a collision has occurred, to the plurality of STAs if at least two of the sRTS frames received from the plurality of STAs collide with each other.

10. The method of claim 9, wherein the nRTS frames are s indicated based on a last subcarrier.

11. The method of claim 9, further comprising:
    receiving second sRTS frames from each of the plurality of STAs through one subcarrier that is randomly determined.

12. The method of claim 11, wherein the second sRTS frames are received through two OFDM symbols.

13. An access point (AP) for transmitting a frame in a wireless local area network (WLAN) system, the AP comprising:
    a radio frequency (RF) unit for transmitting or receiving a radio signal; and
    a processor connected to the RF unit, and configured to:
    receive single-tone request to send (sRTS) frames from a plurality of stations (STAs) respectively through one orthogonal frequency division multiplexing (OFDM) symbol and one subcarrier;
    select STAs that will perform uplink (UL) multi user (MU) multiple-input multiple-output (MIMO) transmission; and
    transmit single-tone clear to send (sCTS) frames allocated to the same subcarrier to which sRTS frames received from the selected STAs have been allocated to the plurality of STAs.

14. The AP of claim 13, wherein the sRTS frames and the sCTS frames are indicated based on a first subcarrier.

15. The AP of claim 13, wherein the one subcarrier on which the sRTS frames are transmitted by each of the plurality of STAs is randomly determined.

* * * * *